Inventor:
Hans Karl Leistritz

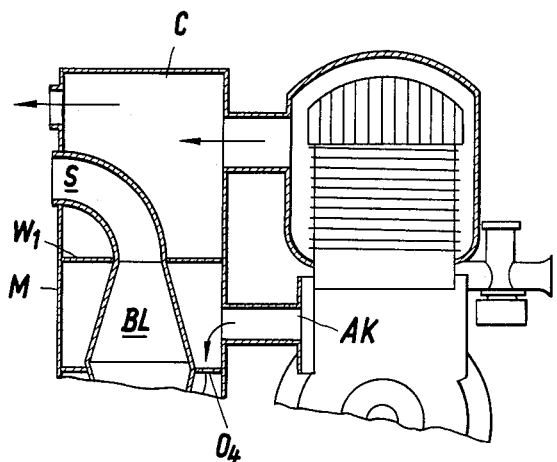
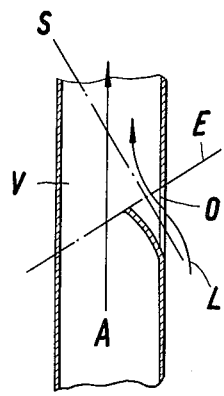
Fig. 3
Fig. 2
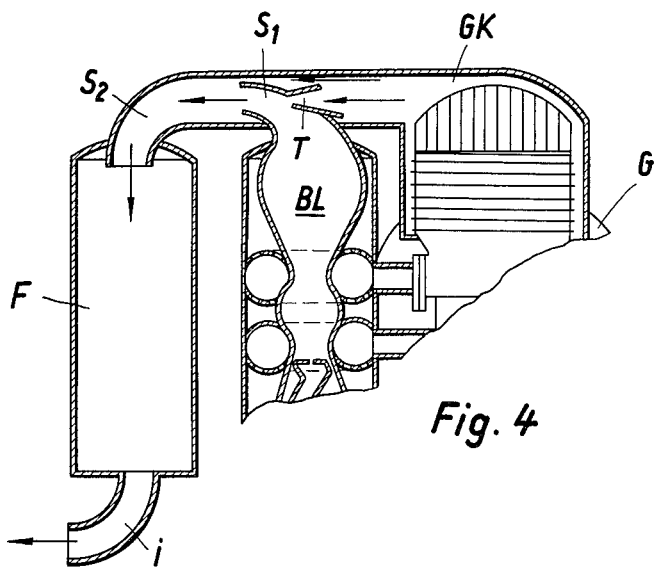
Fig. 4
Inventor:
Hans Karl Leistritz June 7, 1966 H. K. LEISTRITZ 3,254,963
GAS HANDLING APPARATUS FOR USE WITH INTERNAL-COMBUSTION
ENGINES OR OTHER INDUSTRIAL EQUIPMENT WHICH
PRODUCES WASTE GASES
Filed Aug. 14, 1962 7 Sheets-Sheet 3

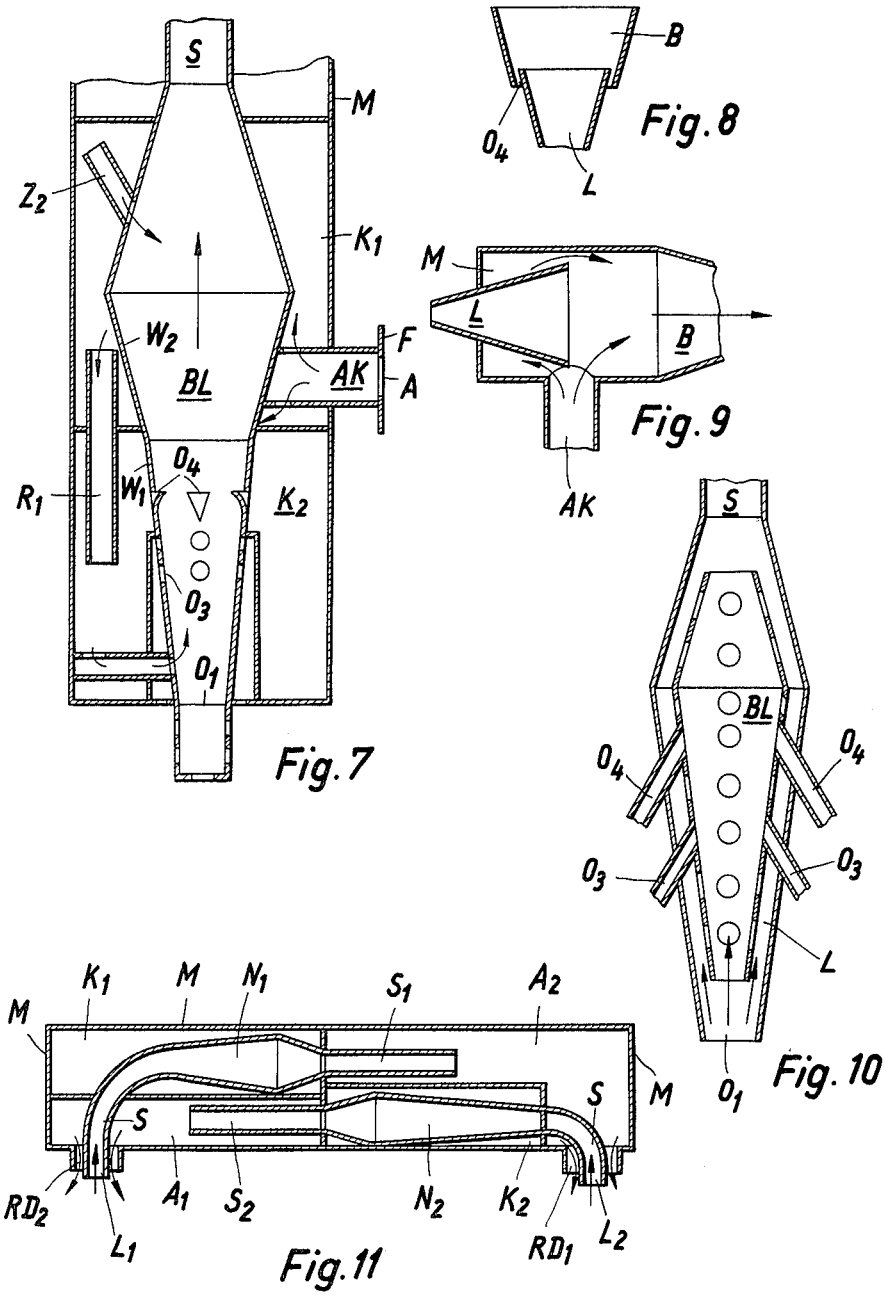

June 7, 1966　　　H. K. LEISTRITZ　　　3,254,963
GAS HANDLING APPARATUS FOR USE WITH INTERNAL-COMBUSTION
ENGINES OR OTHER INDUSTRIAL EQUIPMENT WHICH
PRODUCES WASTE GASES
Filed Aug. 14, 1962　　　　　　　　　　　　　　　7 Sheets-Sheet 5

Inventor:
Hans Karl Leistritz
By Ernest Montague
Attorney

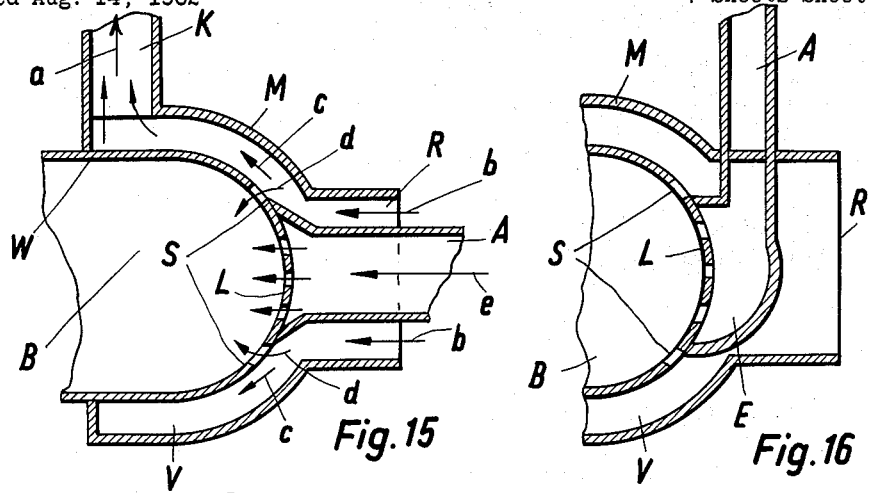
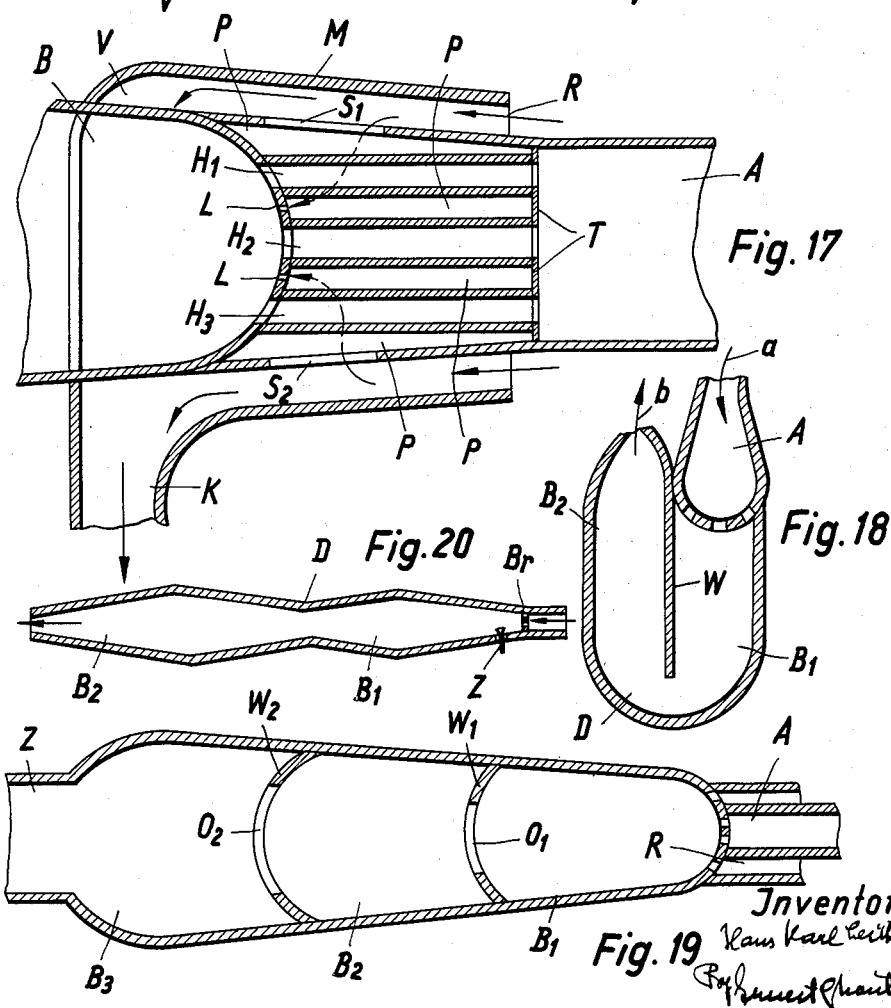

United States Patent Office 3,254,963
Patented June 7, 1966

3,254,963
GAS HANDLING APPARATUS FOR USE WITH INTERNAL-COMBUSTION ENGINES OR OTHER INDUSTRIAL EQUIPMENT WHICH PRODUCES WASTE GASES
Hans Karl Leistritz, Reichenhaller Str. 49, Freilassing, Upper Bavaria, Germany
Filed Aug. 14, 1962, Ser. No. 216,844
Claims priority, application Germany, Oct. 27, 1961, L 40,321; Nov. 9, 1961, L 40,429; Nov. 23, 1961, L 40,535; Nov. 27, 1961, L 40,552; Dec. 9, 1961, L 40,670
11 Claims. (Cl. 23—277)

The present invention relates to a gas handling apparatus for use with internal combustion engines or other industrial equipment which produces waste gases.

Industrial waste gases, particularly waste gases from internal-combustion engines, contain in most cases only a small percentage by volume of combustible constituents. Owing to the dilution with inert gases, the flame propagation velocity of such gases has been reduced to zero under normal conditions in gas handling apparatus as are provided, e.g., in motor vehicles. On the other hand, the residual combustible constituents of the gasses are particularly dangerous by being highly toxic, so that it is desirable to remove them. It is known that this may be effected to some extent by catalytic oxidation. This expensive method has primarily the disadvantage that its efficiency decreases progressively as a result of the saturation of the chemical elements. Besides, it constitutes a resistance to flow in the gas handling apparatus. For this reason, an oxidation by a pure after-combustion appears to be more desirable for use in connection with gas handling apparatus, because any combustion process will produce a certain suction, which is particularly necessary when an additional air intake is required for combustion and is achieved by such a suction action.

As it is stated in the German patents specification No. 938,690 of September 18, 1952, after-combustion chambers are known, in which waste gases are subsequently admixed with air and ignited. All these previously disclosed processes have the disadvantage, however, that their function depends on the presence of a sufficiently high certain proportion of combustible constituents in the waste gasses. Because waste gases from engines must primarily be cleaned from residual CO, the conditions may be considered under which it is possible in the art to initiate the combusition of a mixture of carbon monoxide and air. The range of ignitability in this case is from 12.5–75% combustible gas in the mixture (see the table on page 1263 of "Hütte" I, 28th edition, 1955). The previously disclosed straight after-combustion processes are operable only when the waste gas is so highly enriched with combustible constituents that the mixture of waste gas and air produced in the after-combustion chamber contains a high volume percentage of CO. For this reason, these after-combustion processes are not suitable in practice, because when modern internal-combustions are set to operate under optimum conditions, as is essential, their waste gases contain much less than 12.5 volume percent of CO. For this reason, an after-combustion for a modern engine must operate at CO contents between 3% and 5%. The present invention teaches how this critical reduction of the lower ignitability limit can be achieved with various features.

These features may be generally classified into five groups.

It is one object of the present invention to provide a gas handling apparatus, wherein the first group of features relates to a heat exchanger. The lower the CO content of a waste gas, the more difficult is the initiation and maintenance of the combustion at low temperatures. For this reason, the temperature maintained in the after-combustion chamber should be at least as high as or higher than the igniting temperature of CO. To reach this temperature of 650° C., the waste gas discharged at elevated temperature from the engine outlet is caused to burn while the carburetor has a rich setting and the resulting heat of combustion is transferred by heat exchange to the waste gases and the secondary air before both enter the after-combustion chamber. This results in a progressive increase in the temperature in the combustion chamber and in an increase in the flame propagation velocity, so that a progressively leaner waste gas, i.e., a waste gas containing a progressively smaller volume percentage of CO, may be supplied to the combustion process. The heat exchanger shown has the further advantage that it withdraws as much heat as possible from the gas discharged from the combustion chamber before this gas enters the open. This cooling of the gas discharged into the open may be increased by using this gas for supplying oil or steam circulation heating systems.

It is another object of the present invention to provide a gas handling apparatus, wherein the second group of features relates to the effectiveness and fine adjustment of the air intake system. The first group of features has enabled a preheating of the secondary air. It is also known that the highest flame propagation velocity will not be obtained at the theoretical oxygen content but when there is a slight deficiency of oxygen. For an optimum function of such a fine adjusting system a combustion chamber of a particular design is required. This design provides for the suction required for drawing air into the combustion chamber at a rate from the minimum to a surplus of air.

It is still another object of the present invention to provide a gas handling apparatus, wherein the third group of features provides for a highly turbulent flow in the combustion chamber or in the combined air and combustion chambers. This enables a flame propagation velocity which is much higher than the known values. The difficulty encountered in this connection resides in the fact that the suction required for drawing air into the combustion chamber can be achieved best by laminar currents and should not be eliminated by turbulence. It is known, e.g., that in conical flow passages used as diffusors in waste gas handling apparatus an inclination of 5–8° will provide for an optimum suction effect because it will not result in a separation of the flow at the funnel walls. With respect to the special pulsation resulting from the various factors including the pulsating supply of the waste gas (in the case of a piston engine) and the succession of the explosions of the mixture of waste gas and air, the angular range of 8–18° has proved suitable for an intermittent intake of the required amounts of air in accordance with the pulsation in the combustion chamber and for enabling the turbulent flow required. The turbulence may be promoted by some artificial obstacles, such as a diaphragm-holding pin disposed in the combustion chamber, or by making this diaphragm from corrugated sheet metal, or by causing various waste gas or air inlets to extend to the central region of the combustion chamber or by an arrangement of a branch current preadmixing inlet. A predetermined shape of the opening is particularly desirable for producing turbulence.

It is yet another object of the present invention to provide a gas handling apparatus, wherein the fourth group of features relates to an increase of the action of pressure waves on the combustion. This effect has been described first as a so-called "pulsed combustion" and when burning powdered coal is obtained, e.g., by producing relative movements between the coal particles and oxygen molecules. Pressure waves will then be generated at the resonance frequency of a vibrating column of gas, the action of which is known, inter alia, from the German Patents Nos. 767,657, 768,005 and 880,232 (Paul Schmidt, Munich), and will entrain the gas particles whereas the coal particles having a greater inertia will not be entrained. This results in a relative movement. A similar result is obtained when the waste gas portions subjected to pressure waves from the operation of the engine meet air particles not subjected to such pressure waves. This effect is augmented by the pulsation produced by the successive explosions of the combustion process. The air intake is effected in timed relation with this pulsation. This is the only possible explanation for the fact that the combustion can be increased by certain features, which reside in the fact that the combustion chamber is designed as a resonator, which may be provided by confining its elongated cavity at the ends by wall surfaces, which should be non-apertured or only slightly apertured and provided with edge slots. In this connection, it is remarkable that the rule stated by Paul Schmidt, Munich, in connection with jet devices having a vibrating column of gas, that the gas outlet opening must not be larger in cross-section than three times the opposite end of the resonator, applies also to the present after-combustion chamber. The influence of the pressure wave on the combustion process can be achieved further with a particular diaphragm.

It is also a further object of the present invention to provide a gas handling apparatus, wherein the fifth group of features relates to a control of the velocity of flow and of the resistance to flow so that the flame is maintained as continuously as possible under various operating conditions in spite of the internal turbulence required. It will be understood that the conditions vary greatly depending on the content of combustible gas in the waste gas. A two-stroke cycle engine having high scavenging losses must be treated differently than a four-stroke cycle engine at a very lean setting. It has proved suitable to distinguish between the combustion chamber proper, the combustion chamber outlet opening and the succeeding combustion chamber outlet pipe or combustion chamber outlet compartment.

It is also a feature of the present invention to reduce the explosive effect of the ignitions by introducing waste gas at a certain rate into the air chamber for pre-admixing and to ensure a continuous combustion even when a change in operating conditions has caused the main combustion flame to be extinguished. The rules for the relation of length to diameter of the combustion chamber of turbines (2.25 to 5) can be applied only with restriction to the volume teachings. If the combustion chamber is succeeded by a combustion chamber outlet compartment, the conditions will be different from those obtained when only a suction pipe is provided. In the case of a double-tapered combustion chamber, the calculation would have to be based on a mean diameter; this shows that the above teaching is not applicable.

The mixture of waste gas and air is ignited by igniting sparks, as a rule, by a normal spark plug, which is screwed into the combustion chamber wall and accessible from the outside and is grounded at its threaded connection. The insulated pole is connected to a spark plug of the engine having both poles insulated, so that the spark plug of the engine constitutes the known preceding ignition gap. In industrial engines, particularly those having a constant speed (governor), a priming ignition may be sufficient.

With these and other objects in view, which will become apparent in the following detailed description, the present invention will be clearly understood in connection with the accompanying drawings, in which:

FIG. 2 is a fragmentary view of the combustion and air chambers;

FIG. 3 is a section of the combustion chamber outlet suction pipe;

FIG. 4 is a view similar to that of FIG. 3;

FIG. 7 is a section of an air and combustion chamber;

FIG. 8 is a fragmentary section of the combustion chamber;

FIG. 9 is another embodiment of the showing in FIG. 8;

FIG. 10 is a section of an air chamber surrounding the combustion chamber;

FIG. 11 is a sectional view of an arrangement including a plurality of combustion chambers;

FIG. 15 is a sectional view of a spray nozzle in connection with the combustion chamber;

FIG. 16 is a section of another embodiment of the inlet-nozzle;

FIG. 17 is a sectional view of the inlet structure of the waste gases;

FIG. 18 is a sectional view of the combustion chamber;

FIG. 19 is a sectional view of another embodiment of the combustion chamber;

FIG. 20 is a sectional view of still another embodiment of the combustion chamber.

Figure 1:
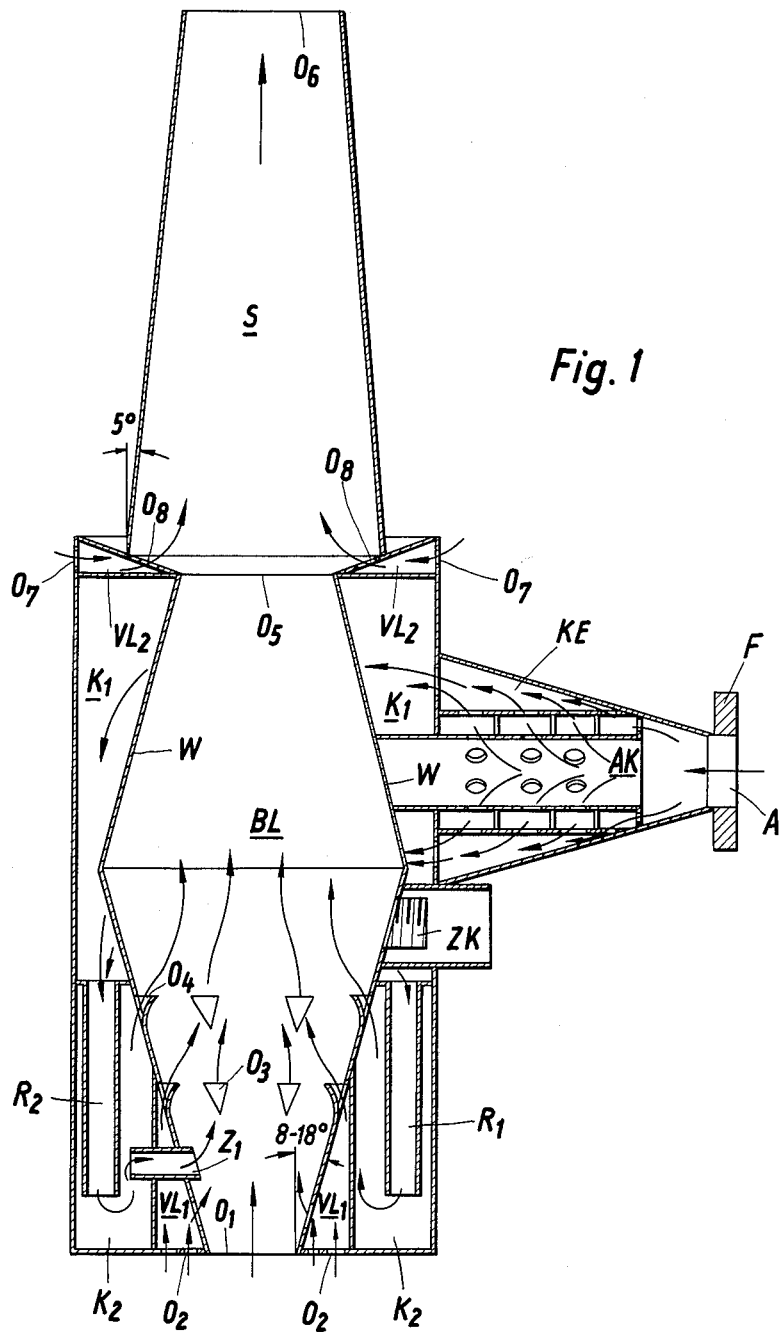
FIGURE 1 is an axial section of an after-burner designed in accordance with the present invention.

Referring now to the drawings, and in particular to FIG. 1, the after-burner is connected with its flange F directly or by means of an interposed pipe to the outlet of the motor (not shown). Through this outlet, the waste gas enters the opening A and the duck AK. The end wall of the waste gas inlet duct AK is at the same time the combustion chamber wall W. Through the four annular compartments of the chamber element KE, the waste gas enters a further compartment and from there flows through holes into the chamber compartment K1, which surrounds a part of the combustion chamber BL. Through the tubular ducts R1 and R2 the waste gas flows from the chamber compartment K1 into the chamber compartment K2, further through the duct Z1 into the air chamber compartment of BL, whereas the main volume of the waste gas enters BL through the openings O4. The combined cavity BL comprises an air chamber compartment having air intake openings O1 and O3 and a succeeding combustion chamber compartment, which begins behind the waste gas inlets O4 for the main volume of waste gas. The lower portion of the cavity BL is surrounded by an air preheating chamber VL1, in which the air entering through openings O3 into the cavity BL is preheated by the walls of the chamber compartment K2 and by the walls of the cavity BL. Air flows from the atmosphere into the air preheating chamber VL1 through the holes O2. A spark plug ZK is screwed into the wall W of the cavity BL. The chamber BL is double-tapered. The combustion chamber outlet opening O5 is not larger than three times the total cross-section O1 and O2 and is succeeded by a combustion chamber outlet compartment S, which has an additional air intake through openings O7, air chamber VL2 and openings O8.

Referring now again to the drawings, and in particular to FIG. 2, the openings extending through the combustion and air chambers are disclosed. The normal S on the plane E of the opening is directed toward the direction of flow A.

Referring now to FIG. 3, an air flow around the combustion chamber outlet suction pipe S through a compartment C supplied with air by the engine blower is disclosed. This causes a cooling of the gas emerging from the combustion chamber outlet suction pipe S and enables a heating with warm air entirely free of waste gases.

FIG. 4 differs from FIG. 3 in that a blower G supplies air into the combustion chamber outlet suction pipe S1 at the funnel-shaped opening T. The resulting gas-air mixture flows through the duct S2 into the compartment F from which it enters through the duct I into the open. This provides for a subsequent combustion chamber zone supplied with additional air.

Figure 5:
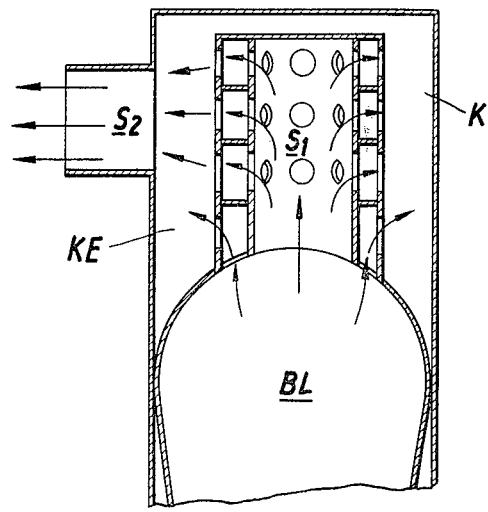
FIG. 5 is a section of the combustion chamber outlet suction pipe, constituting another embodiment thereof.

Referring now to FIG. 5, the combustion chamber outlet suction pipe S1 is surrounded by annular chambers. The gas flows through a further jacket compartment K and through the pipe S2 into the open.

Figure 6:
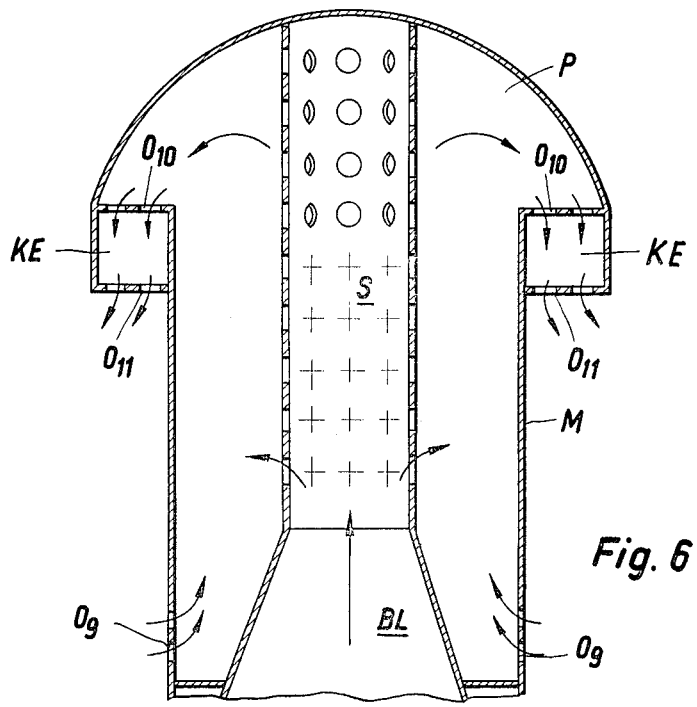
FIG. 6 is a third embodiment of the combustion chamber outlet suction pipe.

Referring now to FIG. 6, gas flows from the chamber BL into a combustion chamber outlet suction pipes, which is perforated throughout and is closed by a wall surface. The compartment P surrounding the pipes discharges the gas through openings O10 into the annular chamber KE, from which it flows through openings O11 into the open. The air intake openings O9 are disposed at the end of the chamber P opposite to the discharge direction.

Referring now to FIG. 7, an air and combustion chamber BL is disclosed, which has initially a cone having an inclination between 5° and 8°. The inlet openings O4 for the main gas volume are disposed in this zone. Behind these openings O4, the inclination is increased by at least 3°. Besides, FIG. 7 shows a duct Z2 for a subsequent introduction of a partial stream of waste gas through the duct Z2 opposite to the direction of flow prevailing in the chamber BL.

According to FIG. 8, waste gas or air can enter the combustion chamber through annular slots O4 rather than, as shown in FIG. 1, through wall openings. These annular slots may be formed by surrounding the wall of a compartment with a wall of a subsequent compartment larger in cross-section, so that an annular gap is formed between both walls.

FIG. 9 is similar to FIG. 8 in that it shows an annular inlet slot for the waste gas. A tapered air chamber L is surrounded by a combustion chamber B larger in cross-section, so that the waste gas inlet duct AK extending laterally into the combustion chamber supplies a partial volume of waste gas directly into that portion of the chamber B which follows the funnel L, whereas the remainder of the waste gas enters the combustion chamber zone proper after having swept the walls of chamber L.

Referring now to FIG. 10, an air chamber L surrounds the entire combustion chamber BL and its walls are continued to define a combustion chamber outlet suction pipe S. The waste gas inlets into the combustion chamber are formed by the ducts O3 and O4 extending through the air chamber L jacket. The wall of the combustion chamber BL is formed with air inlet holes. This design has the advantage that the suction generated at S by the combustion process is particularly effective in drawing in air at the opening O1.

In FIG. 11, the waste gas to be subjected to subsequent combustion is distributed to a plurality of combustion chambers N1 and N2 defined by a common shell M. The air inlet duct of one after-combustion chamber, e.g., L1, is combined with the gas outlet duct of the other after-combustion chamber, e.g., RD2.

Figure 12:
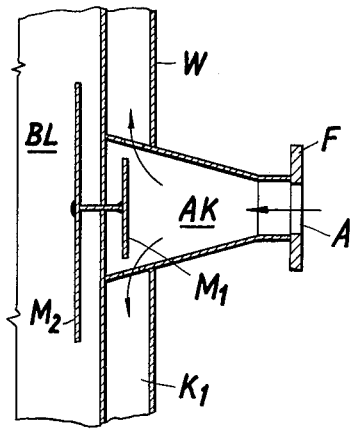
FIG. 12 is a sectional view of the engine outlet pipe.

FIG. 12 shows the transmission of pressure fluctuations in the engine outlet pipe AK by a diaphragm M2 into the combustion chamber. A smaller pre-arranged diaphragm M1 may be attached on that side of the holding pin which extends into the duct AK.

Figure 13:
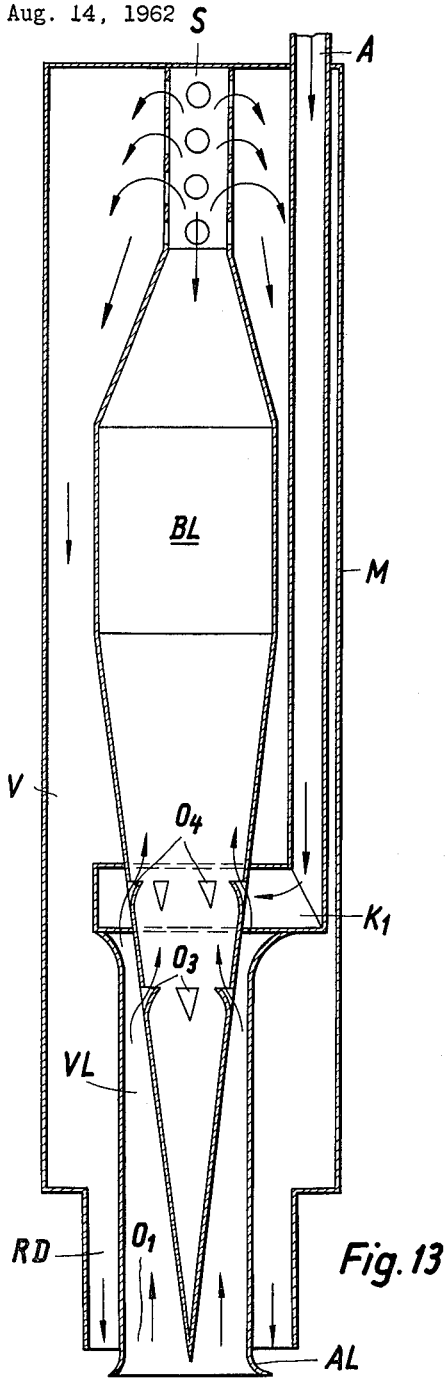
FIG. 13 is an axial section of the heat exchange system.

FIG. 13 is a general view of the heat exchange system. The combustion chamber outlet compartment V surrounds the waste gas inlet pipe A, as well as the waste gas inlet chamber K1. The air intake duct VL is surrounded by the combustion chamber outlet compartment V and the suceeding annular nozzle RD. A large part of the thermal energy transmitted through the combustion chamber outlet compartment is returned to the combustion chamber wall BL. The air intake duct VL, which is surrounded by the gas outlet duct RD, a beadlike deflector AL to deflect the emerging gas from the air inlet opening O1.

Figure 14:
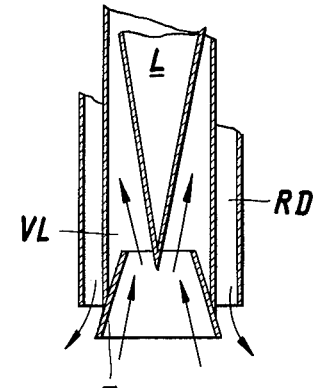
FIG. 14 is a section of a deflector, constituting another embodiment.

FIG. 14 discloses a similar deflector in the form of a funnel T.

Referring now to FIG. 15, the waste gas flows through a duct A and a perforated spray nozzle L into the combustion chamber B and the secondary air flows through the annular nozzle R and the annular slot S into the combustion chamber B. In certain stationary plants (heating installations), the air chamber V may form an air intake compartment for the intake side of the engine, to which the duct K leads in the direction of arrow $a$.

FIG. 16 is a showing similar to that of FIG. 15, yet the inlet nozzle E with the perforated plate L is of a different design.

In FIG. 17, the waste gas partial stream inlets H1, H2 and H3 alternate with the air inlet openings of the perforated plate L approximately in the same plane. The duct K may lead to the intake side of the engine or form another air intake opening.

In FIG. 18, the combustion chamber is divided by a wall W into a zone B1 and a zone B2. During the combustion process, the wall W which has virtually no heat dissipation, is an almost constantly incandescent surface, which promotes the combustion.

FIG. 19 shows a conically enlarged combustion chamber, which is divided into different zones by the walls W1 and W2 and has openings O1 and O2, which are much larger than the waste gas inlet openings from the duct A into the combustion chamber.

In FIG. 20, the combustion chamber consists of two double-tapered compartments B1 and B2, whereby B2 is larger than B1. The constriction D may consist of a cylindrical duct.

Figure 21:
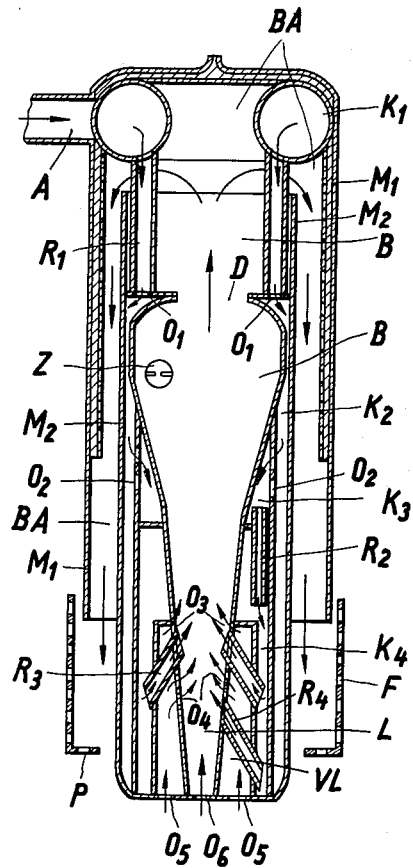
FIG. 21 is an axial section of another embodiment of the apparatus.

Referring now again to the drawings, and in particular to FIG. 21, a design is disclosed for quantity production. The waste gas enters through the waste gas inlet duct A into an expansion chamber K1, which, just as the pipes R1 extending from it are, is surrounded by the combustion chamber outlet compartment BA and the combination chamber B. The waste gas chamber K2, which forms an acoustic element just as the succeeding chambers K3 and K4 and the pipe R2, has, just as K3 and K4, a wall partly in common with the combustion chamber B. Through ducts R3 and R4 the waste gas enters the combustion chamber B, which begins at these inlet openings and which continues as an air intake chamber L, which is tapered with an inclination of about 5°. Only when a cross-section is reached which is approximately as large as the cross-section of the construction D dividing the combustion chamber is the inclination increased to about 15°. The combustion chamber B terminates at the end of the shell wall M2 and is then continued by the combustion chamber outlet compartment of larger cross-section, which is defined by the shell M2 partly lined with a perforated plate and asbestos. The outlet direction of the gas from BA is opposite to the direction of air inflow into the openings O5 and O6, the openings O5 leading into an air feeding channel VL. A perforated plate F having a baffle ring P is attached at the end of BA for flame protection.

While I have disclosed several embodiments of the present invention, it is to be understood that these embodiments are given by example only and not in a limiting sense, the scope of the present invention being determined by the objects and the claims.

What is claimed is:

1. A gas handling apparatus for use with internal combustion engines or other industrial equipment producing waste gases for an after-combustion, comprising a longitudinal unit defining in its up-stream portion an entrance chamber for secondary air and in its downstream portion a combustion chamber, a wall disposed crosswise to the longitudinal axis at each of the opposite ends of said unit, said wall at the entrance chamber having at least one opening for entrance of secondary air, means near the other end of said unit providing for escaping of burned waste gas, an inlet for feeding waste gases into said unit at said other end of the latter, conduit means communicating with said waste gas inlet and leading into said combustion chamber near said entrance chamber, said conduit means being separated from said entrance chamber for secondary air, said conduit means being disposed outside of said combustion chamber and having a common wall with a portion of said combustion chamber in order to bring about a heat exchange therebetween, and ignition means disposed in said combustion chamber near said entrance chamber.

2. The apparatus, as set forth in claim 1, wherein said conduit feeding waste gases into said combustion chamber terminates substantially in the area of joining said air entrance chamber with said combustion chamber.

3. The apparatus, as set forth in claim 1, wherein said unit is widened in the direction toward said combustion chamber.

4. The gas handling apparatus, as set forth in claim 1, wherein said combustion chamber is divided into an upstream portion and into a downstream portion, said portions being separated by a constriction of said combustion chamber, and an air intake chamber disposed outside of and in communciation with said unit.

5. The gas handling apparatus, as set forth in claim 4, which includes a waste gas chamber receiving the waste gases and being in communication with and adjacent to said air intake chamber.

6. The gas handling apparatus, as set forth in claim 5, wherein said waste gas chamber surrounds said unit and provides a stream of waste gases in a counter-stream relative to said stream in said unit.

7. The apparatus, as set forth in claim 6, which includes means defining an air feeding channel surrounding at least partly said air intake chamber.

8. The apparatus, as set forth in claim 1, which includes a preheating air chamber surrounding at least partly said unit, said preheating air chamber having common wall portions with said conduit means feeding waste gases from said engine to said unit, and said common wall portions are disposed in the direction of the flow of said waste gases behind said common wall portions between said conduit means and said combustion chamber.

9. The apparatus, as set forth in claim 1, wherein said conduit means leading into said combustion chamber have a plurality of entrance channels disposed at acute angles to the longitudinal axis of said combustion chamber, at least one group of said entrance openings is distributed about the periphery of said combustion chamber and directed toward a common area along said longitudinal axis of said chambers, and at least one of said entrance openings is disposed on one side of the longitudinal axis of said combustion chamber and directed toward another area along the longitudinal axis of said combustion chamber.

10. The apparatus, as set forth in claim 1, wherein said unit has an angle of 5° to 8° between its wall and the longitudinal axis thereof within the range of said air entrance chamber and said combustion chamber.

11. The apparatus, as set forth in claim 1, which includes a feeding conduit terminating in said unit and feeding waste gas into the latter.

References Cited by the Examiner

UNITED STATES PATENTS

| | | | |
|---|---|---|---|
| 1,875,024 | 8/1932 | Krysanowsky | 23—288 |
| 2,065,681 | 12/1936 | Fogas | 23—277 |
| 2,293,632 | 8/1942 | Sauer | 60—30 |
| 2,831,548 | 4/1958 | Barkelew | 181—43 |
| 2,928,492 | 3/1960 | Nelson. | |
| 2,947,600 | 8/1960 | Clayton | 23—288 XR |
| 2,985,255 | 4/1961 | Clark | 23—277 |
| 3,031,824 | 4/1962 | Court | 23—277 XR |

FOREIGN PATENTS 1,088,764  9/1960  Germany.

MORRIS O. WOLK, *Primary Examiner.*